United States Patent Office 3,410,582
Patented Nov. 12, 1968

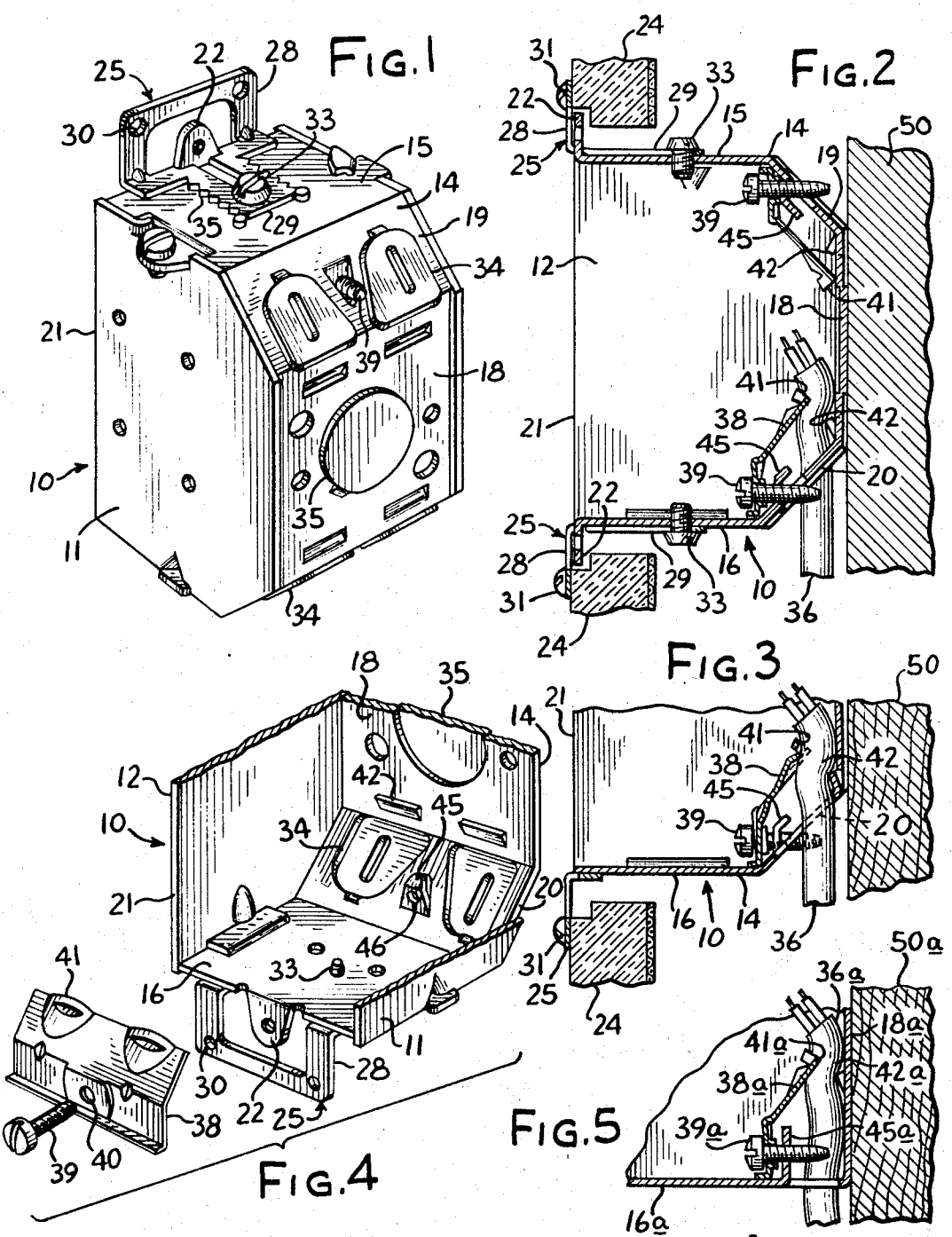

3,410,582
BOX CLAMP AND SCREW ASSEMBLY
Norton A. Appleton, Northfield, Ill., assignor to Appleton Electric Company, Chicago, Ill., a corporation of Illinois
Filed Oct. 5, 1966, Ser. No. 584,578
3 Claims. (Cl. 285—128)

ABSTRACT OF THE DISCLOSURE

A switch box having end panels each formed with a transverse tab which receive a screw for adjustably securing a cable clamp member. The transverse tab is formed generally parallel to and spaced a distance from the back panel of the switch box so that the screw is disposed perpendicularly to the back panel and is permitted a full range of adjustment while maintaining clearance with the plane of said back panel.

---

The present invention relates to switchboxes for use in electrical wiring systems. More particularly, the invention concerns an improved clamping means for securing electrical cables in place in a wall mounted switch or outlet box.

In wall mounted switchboxes of a type commonly known heretofore, the screws which secure the clamps against the electrical cables project out through the rear wall of the switchbox. When the switchbox is mounted so that its back or side panel abuts against a stud or other upright wall surface, the projecting ends of the clamping screws tend to press against the abutting stud or wall surface as an incident to clamping the cable. This creates difficulty in installation of the box and may even tend to loosen a box that had otherwise been securely mounted.

To avoid the problem of passing the clamping screws into the wall adjacent the rear of the box, some switchboxes have been formed with end and back panels having corner sections inclined to the wall. The clamping screws are passed perpendicularly through the inclined corner at an angle to the wall so that the portions of the screws projecting through the box do not extend to the plane of the wall. This latter arrangement, however, has the inherent disadvantage of requiring the electrician who adjusts a clamping screw to hold the screwdriver at a sharp angle to the front plane of the box, making it more difficult to reach the screw due to the compact arrangement of the box.

With the foregoing in mind, it is an object of the present invention to provide an improved clamping means for use in a wall mounted switchbox whereby the clamping screw is permitted a full range of adjustment without interfering with a wall or stud immediately behind the switchbox.

Another object of the invention is to provide a clamping means as characterized above in which the clamping screw is held normal to the front plane of the box so as to be easily accessible for adjustment.

Other objects and advantages will become apparent as the following description proceeds, taken in connection with the accompanying drawings in which:

FIGURE 1 is a perspective view of a switchbox embodying the present invention;

FIG. 2 is a vertical sectional view of the switchbox shown in FIG. 1 when mounted in a wall with a stud immediately adjacent the rear plate of the box;

FIG. 3 is a fragmentary vertical sectional view of the switchbox as shown in FIG. 2, taken substantially in the plane of a cable being secured in the box;

FIG. 4 is a perspective view of the switchbox shown in FIG. 1 with a portion broken away to show the interior of the box, the clamping jaw and screw being shown unattached and in spaced relation; and FIG. 5 is a fragmentary vertical sectional view of a switchbox embodying a modified form of the invention.

While the invention is susceptible of various modifications and alternative constructions, certain preferred embodiments have been shown in the drawings and will be described below in detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIGURE 1, the invention is there embodied in an illustrative switch or outlet box 10. The box 10, which may be conveniently formed of heavy gauge sheet metal stampings, comprises a pair of side panels 11, 12 fixed to and separated by a spacer panel 14. In this case, the spacer panel 14 is of generally U-shaped form and describes a pair of opposed end panels 15, 16 contiguous with a back panel 18. In the illustrated switchbox, the end panels 15, 16 include inclined sections 19, 20, respectively, which form the corners of the spacer panel 14. The U-shaped spacer panel 14 together with the side panels 11, 12 define a box structure having a front opening terminating in a free edge 21. The end panels 15 are each formed with a mounting ear 22 lying adjacent the free edge 21 which are adapted to serve as anchorage points for a convenient wall outlet or switch housed within the box.

In order to secure the box 10 to a wall 24 or other appropriate support, an adjustable mounting bracket 25 may be provided on each end panel 15, 16 of the box. The brackets 25 each comprise a pair of substantially perpendicular legs 28, 29. When the bracket 25 is mounted on the box, one leg 28 extends outwardly from the box and is provided with holes 30 to receive screws 31 or other appropriate fasteners for mounting the box on the wall 24, while the other leg 29 is held flush against the end panel by a screw 33. Each bracket 25 may be selectively positioned behind the free edge 21 so as to accommodate the box for use with a wide variety of wall thicknesses by loosening the screw 33 and positioning the bracket 25 so that desired indentations 35 formed in the leg 29 mate with projections 36 formed in the end panel.

To accommodate an electrical cable, the panels of the box are formed with a series of knockout plugs 34, 35 which, when removed permit the introduction of one or more electrical conduits 36 carrying power supplying wires into the box. In the illustrated embodiment, a central plug 35 is provided in the back plate 18 while a pair of plugs 34 are formed in the inclined sections 19, 20.

To anchor the cable 36 within the box, adjustable clamp jaws 38 at opposite ends of the box are held by screws 39 against the cable so as to clamp the cable against the back panel 18. Each of the illustrated clamps are formed with a hole 40 through which the clamping screw 39 is passed and have a pair of bearing edges 41 to facilitate gripping the cable. The back panel 18 is provided with pairs of similar gripping projections 42 disposed correspondingly to the bearing edges 41 on the clamp jaws.

In accordance with the invention, the end panels are each formed with a transverse screw mounting tab generally parallel to and spaced a distance from the back panel of the switchbox so as to receive the clamping screw perpendicular to the back panel and permit the screw a full range of adjustment while maintaining clearance with the plane of the back panel. In the embodiment illustrated in FIGS. 1 through 4, a screw mounting tab 45 is formed in the inclined sections 19, 20 of each of the end panels 15, 16, midway between the side panels 11, 12. The tabs 45 may be conveniently pierced out of the end panels during the original stamping operation in which the panels are cut and formed. The tabs 45 each have a portion parallel to the back panel 18 and are formed with a threaded hole 46 adapted to receive the clamping screw 39 perpendicular to the tab and the back panel. The tabs 45 are spaced from the back panel 18 so that when the screw is tightened to its extreme forward clamping position, it will not extend past the plane of the back panel 18.

Thus, when the switchbox is mounted in a wall 24 so that the back panel is abutting against a stud 50 or other wall surface, as shown in FIGS. 2 and 3, the clamping screws 39 do not extend to the stud 50 so as to interfere with the assembly or mounting of the switchbox by requiring the screw to be passed into the stud. Moreover, it is apparent that since the clamping screws 39 are perpendicular to the rear panel 18, they are easily accessible by a screwdriver from the front of the box for adjustment. The tabs, therefore, provide a simple and desirable mount for the clamping screws and may be economically formed during the original stamping of the box panels.

A modified form of the invention is shown in FIG. 5 wherein similar parts have been given numbers corresponding to those previously described with the distinguishing suffix *a* added. In this embodiment, an end panel 16*a* extends directly to a back panel 18*a* without an inclined corner section. A cable 36*a* is introduced into the box through a hole 34*a* formed in the end panel 16*a* adjacent the back panel 18*a*. A screw mounting tab 45*a* similarly is pierced from the end panel 16*a* generally parallel to the back panel 18*a* so as to receive a clamping screw 39*a* perpendicular to the end panel. The tab 45*a* is spaced sufficiently from the back panel 18*a* so that the cable 36*a* may be securely held by an adjustable clamp jaw 38*a* without the clamping screw 39*a* extending past the plane of the back panel.

I claim as my invention:

1. A switchbox comprising in combination, a pair of opposed side panels interconnected by a pair of end panels and a back panel, said panels defining a front opening box, said end panels having apertures through which electrical cables may be introduced into said box, at least one of said end panels being formed with a transverse tab generally parallel to and spaced a distance from said back panel, a clamping screw threadably engaged with said transverse tab and passing through said tab perpendicularly [disposed] to said tab and said back panel, a clamp adjustably held by said clamping screw adapted to secure a cable against said back panel, and said tab being spaced with respect to said back panel so that said clamping screw is permitted a full range of adjustment while maintaining clearance with the plane of said back panel.

2. The switchbox of claim 1 in which said end panels include inclined corner sections contiguous with said back panel, said tab being pierced inwardly from said inclined section so as to be disposed within the box parallel to said back panel, and said clamp having a leg portion extending generally parallel to said inclined corner section, said leg portion having a bearing edge for engaging a cable at a distance from said end panel to secure said cable against said back panel.

3. The switchbox of claim 1 in which said end panels define substantially square corners with said back panel, and said clamp has an extended leg portion with a bearing edge for engaging a cable at a distance from said end panel to secure said cable against said back panel.

References Cited

UNITED STATES PATENTS

| | | | |
|---|---|---|---|
| 956,674 | 5/1910 | Bonnell | 285—128 X |
| 2,063,923 | 12/1936 | Gries | 248 |
| 2,814,509 | 11/1957 | Clark | 285—128 |
| 2,850,300 | 9/1958 | Jennings | 285—128 |

LARAMIE E. ASKIN, *Primary Examiner.*